United States Patent [19]

Hahn et al.

[11] Patent Number: 6,124,396
[45] Date of Patent: Sep. 26, 2000

[54] BRANCHED WATER-SOLUBLE ACRYLAMIDE COPOLYMERS OF HIGH MOLECULAR WEIGHT AND PROCESS FOR MANUFACTURING THEM

[75] Inventors: Mathias Hahn, Wilhelmshorst; Werner Jaeger, Kleinmachnow, both of Germany; Jeffrey R. Cramm, Batavia; Wesley L. Whipple, Naperville, both of Ill.

[73] Assignee: Nalco Chemical Company, Naperville, Ill.

[21] Appl. No.: 09/000,042

[22] PCT Filed: Jan. 30, 1997

[86] PCT No.: PCT/DE96/01273

§ 371 Date: Mar. 23, 1998

§ 102(e) Date: Mar. 23, 1998

[87] PCT Pub. No.: WO97/03098

PCT Pub. Date: Jan. 30, 1997

[30] Foreign Application Priority Data

Jul. 7, 1995 [DE] Germany .............................. 195 24 868
Jul. 7, 1995 [DE] Germany .............................. 195 24 869

[51] Int. Cl.$^7$ ................................ C08F 3/32; C08J 41/00; C08L 37/00
[52] U.S. Cl. ......................... 524/801; 524/812; 524/815; 524/555; 526/84; 526/87; 526/307.3
[58] Field of Search ..................... 524/801, 812, 524/815, 555; 526/307.3, 84, 87

[56] References Cited

U.S. PATENT DOCUMENTS 2,923,701  2/1960  Schuller et al. .
3,920,599  11/1975 Hurlock et al. .
4,077,930  3/1978  Lim et al. .
5,211,854  5/1993  Liao et al. .

FOREIGN PATENT DOCUMENTS 2019984  12/1990  Canada .
2063656  3/1992   Canada .
0 363 024 4/1990  European Pat. Off. .
374458   2/1995   European Pat. Off. .
374457   4/1996   European Pat. Off. .

OTHER PUBLICATIONS

Acta Polymerica, 36 100–102 (1985).

*Primary Examiner*—Nathan M. Nutter
*Attorney, Agent, or Firm*—Michael B. Martin; Thomas M. Breininger

[57] ABSTRACT

This invention concerns comb-like branched, water-soluble cationic acrylamide copolymers, prepared from 1–40 mole % of a water-soluble cationic prepolymer backbone of formula I $$-[A-B-NR]_n-\qquad\qquad I$$

where A is an unsaturated ammonium compound or acrylamide and B—NR— is selected from the group consisting of olefinically unsaturated, functional amine-group-containing monomers, triethanolamine, and diethanolalkylamine, and the amount of B—NR is 1 mole % to 50 mole % and n represents a degree of polymerization which leads to molecular weights in the range from 1000 to 200,000 g/mole, and 60 to 99 mole % acrylamide by graft polymerization of the acrylamide onto the amine-group-containing cationic prepolymer backbone with a water-in-oil emulsion technique, and the comb-like branched acrylamide copolymers have a molecular weight of >1 million.

15 Claims, No Drawings

BRANCHED WATER-SOLUBLE ACRYLAMIDE COPOLYMERS OF HIGH MOLECULAR WEIGHT AND PROCESS FOR MANUFACTURING THEM

This is a 371 of International Application PCT/DE/01273 filed Jul. 8, 1996.

The present invention is concerned with novel, water-soluble, cationic, modified acrylamide copolymers branched in a precisely determined way and especially with DADMAC-acrylamide copolymers of high molecular weight and with a process for manufacturing them. Copolymers of this type are useful for water-treatment processes as flocculating agent for purification of industrial waters, as sludge conditioner for municipal water or as drainage and retention aid in paper manufacture.

Due to the increasing environmental awareness in carrying out industrial processes and from the point of view of the diminishing supplies of water, related with the need for reusing it, water-soluble polymers with high-molecular weight are today products of increasing economical importance. Polyelectrolytes with high-molecular weight are utilized in a large number of industrial processes in order to influence the degree of separation of solid substances for liquid streams by coagulation, flocculation, clarification, deposition, retention or other mechanisms.

Polymerization of diallyldimethylammonium chloride (DADMAC) leads to water-soluble cationic polymers. In contrast to this, after polymerization, acrylamide gives water-soluble polymers which are essentially nonionic in nature. Therefore, copolymerization of DADMAC and acrylamide monomers leads to the formation of copolymers with different cationic properties, depending on the amount of DADMAC units incorporated into the copolymer chain.

Copolymerization of DADMAC and acrylamide in solution is well known and is described, for example, in U.S. Pat. No. 2,923,701. It is also known that the molecular weight of the obtained copolymers is limited when a solution polymerization process is used. Therefore, in many examples from the state of the art, an attempt is made to overcome this by using an emulsion polymerization technique. According to the teaching of U.S. Pat. No. 3,920,599, for example, stable water-in-oil copolymer emulsions are prepared or the preparation of stable emulsion copolymers of DADMAC and acrylamide is published in U.S. Pat. No. 4,077,930, which can be inverted by the addition of water. In other patents, it is explained that the utilization of different types of initiators is to be preferred for latex copolymerization, as in the case of U.S. Pat. No. 4,439,500, in which ammonium persulfate is the preferred free-radical initiator, or in the case of the CA Patent No. 2,021 984, in which 2,2'-azobis-(2,4-dimethyl)-valeronitrile is disclosed as outstanding initiator. The addition of chain-transfer agents to prevent gel formation during polymerization is always considered necessary. Suitable chain-transfer agents are added at the beginning of the polymerization process. Examples of such additives are lower alkanols or mercaptoalcohols but halogenated hydrocarbons have also been used to suppress gel formation. The content of otherwise similarly performed synthesis methods is the use of special types of chain transfer agents. Thus, in the case of the CA Patent No. 2,063,656, the necessity of addition of sodium formate at the end of the polymerization, in order to obtain a gel-free latex copolymer, is disclosed. In contrast to that, in EP Patent No. 0,363,024, the preferred utilization of sodium hypophosphite is explained as a chain transfer agent. The addition of the chain-transfer agent is also carried out here at the end of the process, just before the last heating period, in order to minimize the residual monomer content.

Due to the greatly different reactivities of acrylamide and DADMAC in free radical polymerization, different copolymerization parameters arise (Jaeger et al., Acta Polymerica 36 (1985), 100–102). Therefore, in an intermittent copolymerization process, acrylamide-rich polymer chains are formed in the initial phase. Later, due to the rapidly diminishing acrylamide concentration in the reaction mixture, the amount of DADMAC gradually increases in the copolymer. In addition, the reaction stops at a DADMAC conversion of approximately 80%. This disadvantage is mentioned in all publications of the state of the art, for example, in CA Patent No. 2,021,984, CA Patent No. 2,063,656 or in U.S. Pat. No. 3,920,599.

In order to increase the DADMAC conversion but also to achieve a more uniform distribution of the cationic functions in the copolymer, in EP Patent No. 0,363,024 a stepwise or continuous addition of acrylamide to the original latex is disclosed, which contains only a part of the necessary acrylamide concentration. On the other hand, this process leads to polymers with molecular weights which are clearly lower in comparison to that of polymers prepared by a corresponding batch process.

It is known that the application properties of water-soluble polymers are related to their polymer molecular weight. Furthermore, it is generally recognized today that the increase of the molecular weight of the polymer by chain branching leads to polymers with improved properties. EP Patent No. 0,374,458 discloses the synthesis of such a type on DADMAC-acrylamide polymer emulsion by the use of small amounts of polyfunctional monomers such as methylenebisacrylamide as chain-branching agents, and EP Patent No. 0,374,457 describes the same process in an inverse microemulsion. Due to the danger of gel formation as a result of uncontrolled overdosage of the polyfunctional monomer, the utilization of polyfunctional monomers is disadvantageous from the standpoint of reaction reliability.

An improved process for the synthesis of branched acrylamide copolymers is described in U.S. Pat. No. 5,211, 854. The problem of gel formation during copolymerization due to the utilization of polyfunctional copolymers is prevented here by the copolymerization of acrylamide with a macromonomer containing cationic units. In this way, comb-like polymer structures with acrylamide as polymer backbone are obtained, in which the cationic charges are arranged as chain units of the side chain. The macromonomer is synthesized in an introductory synthesis step in a solution-polymerization process, in which, fortunately, a peroxide is used as free-radical initiator and Cu(II)-sulfate as oxidative chain-transfer agent in order to produce a terminal unsaturated double bond. The obtained macromonomer is then used as the cationic component in the copolymerization with acrylamide, and the polymerization process is carried out using a usual inverse emulsion technique.

The task of the present invention is to provide novel, water-soluble, branched cationic acrylamide copolymers with a high molecular weight, containing quaternary ammonium groups. Furthermore, it is a task of the invention to propose a method for the synthesis of such types of acrylamide copolymers which are characterized by 100% polymerization conversion, both of the acrylamide monomer as well as the DADMAC.

Regarding the copolymer, the task is solved by the characterizing features of Claim 1, and regarding the process by the characterizing features of Claim 7. The Subclaims show advantageous further developments.

The novel cationic, branched copolymers are characterized first of all by a comb-like structure, in which, in contrast to copolymers of the state of the art, the cationic functions represent the chain units of a rigid polymer backbone, but the acrylamide units are arranged in the side chains of the macromolecules. Polymers according to the invention with acrylamide in the backbone are characterized by a more flexible backbone chain. In this case, the backbone chain consists of chain units of low basicity, or the backbone is a copolymer of acrylamide and a monomer of low basicity.

The copolymers according to the invention have a prepolymer backbone represented by formula I:

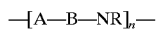

$$-[A-B-NR]_n- \qquad\qquad I$$

The sequence —[A—B—NR]$_n$— of the branched macromolecular chain represents a rigid backbone consisting of repeating cationic monomer units A, and containing a well-specified amount of tertiary functional amine groups B—NR.

The chain units A preferably consist of DADMAC, but other cationic monomeric structures such as 2-acryloyloxyethyltrimethylammonium chloride, 3-methacrylamidopropyltrimethylammonium chloride or 2-methacryloyloxyethyltrimethylammonium chloride are also used for forming the polymer structure.

Furthermore, the sequence —[A—B—NR]$_n$— also represents a more flexible backbone of repeating acrylamide units A and monomer units B—NR— containing tertiary functional amine groups.

The functional unit B—NR— of the backbone chain contains a compound, which is chosen from the class of olefinically unsaturated monomers containing a functional amine group, such as dialkylaminopropyl methacrylamide, dialkylaminoethyl acrylate or dialkylaminoethyl methacrylate and diallylalkylamine. The preferred structure of sequence [B—NR—] is however triethanolamine.

In all cases, an acrylamide (symbol [C]) is grafted onto the amine-group-containing cationic prepolymer backbone, so that the polymers having general formula II with the groups defined above are formed.

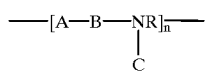

$$\begin{array}{c}-[A-B-NR]_n-\\ |\\ C\end{array} \qquad\qquad II$$

The molecular weight of the water-soluble prepolymer backbone lies in the range from 1000 to 200,000 g/mole, preferably from 10,000 to 100,000 g/mole. The degree of polymerization n of the prepolymer is therefore chosen in such a way that the molecular weight given above results.

The novel, water-soluble, comb-like, cationic polyelectrolytes are polymers based on acrylamide as well as on a suitable water-soluble, cationic prepolymer, which contains at least 1 mole % to 50 mole % of compounds containing functional amine groups.

The molecular weights of the novel, comb-like branched, cationic acrylamide copolymers are generally very high, but the molecular weights can be adjusted using the general rules of free-radical polymerization. Furthermore the polymer molecular weights can be selected depending on the desired application. The molecular weights are >1 million, preferably >10 million g/mole.

The new graft copolymers are prepared by a two-step polymerization process. First, the amine-group-containing highly cationic prepolymer is prepared by free radical copolymerization of DADMAC and the unsaturated amine monomer in the known manner or by homopolymerization of DADMAC using a special redox initiator system, which consists of triethanolamine and ammonium persulfate. The more flexible prepolymer is synthesized by free-radical homopolymerization of an unsaturated polymerizable amine monomer or by copolymerization of this type of monomer with acrylamide. The polymerization is preferably carried out with a solution polymerization technique. The graft copolymerization of acrylamide onto the amine-group-containing cationic prepolymer is done with a water-in-oil emulsion technique.

In general, the water-in-oil polymer emulsion can be prepared using any organic liquids of the following type:

aromatics, such as benzene, toluene or xylene or aliphatic hydrocarbons, mineral oils, kerosene, petroleum.

An especially useful oil is the branched-chain isoparaffin solvent sold under the commercial name "Isopar M".

Low-HLB wetting agents of the sorbitan ester type (products of the SPAN Series, ICI) can be chosen as emulsifying agent, and a preferred emulsifying agent is sorbitan monooleate (SPAN 80). Mixtures of SPAN products with polyoxyethylene-modified sorbitan esters (TWEEN Products, ICI) are also used successfully. In addition, polymeric wetting agents can be used as part of the stabilization system.

Initiation of the polymerization is done by a redox reaction of the amine-group-containing prepolymer with a suitable oxidizing agent. The oxidizing agent in the initiation system is a salt of persulfuric acid, preferably ammonium persulfate.

The persulfate salt is dissolved in the aqueous phase together with the other components of this phase, the monomeric acrylamide and the amine-group-containing prepolymer described above, which at the same time serves as the reducing component of the initiation system.

The aqueous phase, which consists of acrylamide, DADMAC prepolymer and persulfate, where the amount of these components lies between 20 and 70 weight % and the preferred solids content lies between 40 and 60 weight %, is freed from oxygen by blowing nitrogen gas through it. Separately, the oxygen is also driven out from the organic phase, which consists of the hydrocarbon liquid and the wetting agents, by blowing nitrogen gas through it. Just before the aqueous phase is dispersed in the oil phase, the pH of the aqueous phase is adjusted to an optimum value which is determined by the pK value of the functional amine group.

In the case of an aqueous phase with low viscosity, the "classical" method of the inverse emulsion technique may be used. In this case, the oil and water phase are prepared separately, followed by preparation of the w/o emulsion and purification with nitrogen, before the aqueous solution of the persulfate salt is added.

The reaction temperature is kept constant during the polymerization process and is adjusted to between 15 and 50° C., preferably between 20 and 35° C. The novel water-in-oil emulsions, which were prepared using the components described here and according to the method described here, have low volumetric viscosities and are characterized by a high degree of stability.

The following examples are merely given for the purpose of explanation and must not be considered as limitations of the present invention.

EXAMPLE 1

The inverse emulsion polymerization was carried out in a 1 L glass reactor equipped with a special stirrer made of stainless steel. The stirrer speed was 300 rpm.

Preparation of the aqueous phase:

A 48% aqueous solution of acrylamide, 175 g, and a solution of 84 g of a DADMAC prepolymer with a triethanolamine unit content of 3 mole % in 75 g of water were mixed in a suitable vessel. Nitrogen gas was blown through the viscous solution for 30 minutes before addition of 2 g of 1 N NaOH and 200 mg of ammonium persulfate (2 g of a ten percent solution) (in this sequence; the persulfate was added directly before this phase was dispersed in the oil phase).

Preparation of the oil phase:

Isopar M (Exxon), 145 g, was filled in a separate vessel and mixed with the following reagents:

9.45 g of Span 80 (sorbitan monooleate—ICI)

5.25 g Tween 85 (POE-(20) sorbitan trioleate—ICI)

9.45 g of Hypermer 1083 (a nonionic, polymeric wetting agent—ICI).

Nitrogen was blown through the mixture for 30 minutes.

The aqueous phase was then transferred into the oil phase and the mixture was homogenized in order to obtain a stable emulsion, using an Ultraturrax (8000 rpm). The double-walled glass reactor was loaded with the emulsion and the latex was polymerized at a controlled temperature of 25° C. for four hours. A stable latex with a low viscosity and an average particle size of 5 µm was obtained. Complete polymerization conversion followed, which was determined by the gravimetric method. The phase inversion was carried out by addition of 10 g of latex to a mixture of 1 g of wetting agent with a high HLB value (Nonidet P 40, FLUKA) in 150 g of deionized water at 60° C. under agitation with a propeller stirrer at 3000 rpm. The viscosity of a 0.2% solution of the inverted sample in 1 N NaCl was determined to be 9.54 dL/g.

EXAMPLES 2 AND 3

The same process as in Example 1 was carried out, but the ratio of the prepolymer to acrylamide was varied. The amounts of the reagents and the viscosity coefficients (specific viscosity/c) of the 0.2% solution of the obtained graft copolymers in 1 N NaCl are given in Table 1.

TABLE 1

| Graft copolymerization by inverse emulsion polymerization | | |
|---|---|---|
| reagent | Example 2 | Example 3 |
| acrylamide 48% | 175 g | 175 g |
| DADMAC prepolymer | 56 g | 42 g |
| water | 50 g | 37.5 g |
| ammonium persulfate | 200 mg | 200 mg |
| Isopar M | 122 g | 111 g |
| Span 80 | 7.95 g | 7.23 g |
| Tween 85 | 4.42 g | 4.0 g |
| Hymermer 2296 [sic] | 7.95 g | 7.23 b |
| viscosity dL/g | 12.35 | 16.87 |

All these polymerization reactions went to complete conversion of the monomeric acrylamide.

EXAMPLES 4 AND 5

In the following comparative examples, the special nature of the polymerization process when using a polymer as part of the aqueous initiation system in comparison to the usual inverse emulsion technique is shown.

The same method was used for the production of a graft copolymer emulsion of acrylamide on an amine-group-containing prepolymer. The prepolymer was synthesized by copolymerization of the DADMAC with dimethylaminopropyl methacrylamide. The content of functional amine groups or this copolymer was 10 mole %. The following Table 2 shows the reagents used, which were the same for both experiments.

TABLE 2

| Formulation used | |
|---|---|
| reagents | gram |
| Isopar M | 145 |
| 48% acrylamide | 175 |
| DADMAC prepolymer | 84 |
| water | 75 |
| sodium hydroxide | 3.5 |
| 10% ammonium persulfate solution | 2 |
| Hypermer 1599A | 9.45 |
| Tween 81 | 5.45 |
| Span 60 | 9.45 |

In Comparative Example 4, the persulfate solution was added according to the description in Example 1, while in Example 5, the aqueous initiator solution was added to the prepared inverse latex. Example 4 led to a stable copolymer emulsion in which the monomeric acrylamide was converted completely. The viscosity of a 0.2% solution of the inverse polymer was found to be 14.72 dL/g. On the other hand, in Comparative Example 5, in which the initiator was added to the latex, no polymerization occurred within a reaction time of 8 hours.

EXAMPLE 6

This example is a sample process for the synthesis of acrylamide copolymer latex, which is characterized by a flexible backbone chain. An 80:20 copolymer of acrylamide and dimethylaminopropyl methacrylamide was used as the polymeric amine compound.

Preparation of the oil phase:

Tween 61, 6.35 g, 8.65 g of Span 80 and 130 g of hydrocarbon oil were introduced into a 500 mL beaker. The obtained mixture was heated on a heating plate to 58° C. A solution was obtained.

Preparation of the monomer phase:

The solid 80:20 copolymer of acrylamide and dimethylaminopropyl acrylamide, 2.05 g, 79.19 g of deionized water, 263.71 g of a 48% solution of acrylamide in water and 0.05 g of versene were introduced into a 500 mL beaker. The obtained mixture was stirred until the prepolymer went into solution. The pH was measured to be 10.97.

Formation of emulsion:

The oil phase was introduced into a 1.5 L reactor. The monomer phase was introduced into the reactor while the oil phase was stirred at 938 rpm. The obtained mixture was stirred at 45° C. for 30 minutes (938 rpm) and nitrogen was blown through it, and then the emulsion was cooled to 25° C.

A solution of 0.856 g (3.75 mmole) of ammonium persulfate in 9.14 g of water was added to the reaction mixture at a constant rate for 3.15 hours (3.17 mL/h). 45 minutes after beginning of the reaction, when the temperature increased from 25° C. to 26° C., the reactor was placed into ice. The polymerization conversion was estimated from density measurements and the conversion was measured to be complete after 270 minutes. The intrinsic viscosity was determined at 30° C. and was found to be 14.3 in 1 M $NaNO_3$.

EXAMPLE 7

The inverse emulsion polymerization was carried out in a double-walled 1 L glass reactor equipped with a special stirrer made of stainless steel. The stirrer speed was selected to be 750 rpm during the phase of addition of the initiator and 300 rpm in the polymerization phase.

Preparation of the aqueous phase:

The glass reactor was charged with 140 g of 60% aqueous solution of acrylamide and a solution of 84 g of a DADMAC prepolymer, which contained 3 mole % of triethanolamine units in 75 g of water. Nitrogen gas was blown through the viscous mixture under gentle agitation for 30 minutes before 2 g of 1 N NaOH was added.

Preparation of the oil phase:

Tween 85, 5 g, was dissolved in 100 g of Isopar M in a suitable vessel and nitrogen was blown through the mixture for 30 minutes.

Then the oil phase was added to the aqueous phase within 5 minutes and nitrogen was blown for 30 minutes through the obtained oil-in-water emulsion. At the same time, the temperature of the reaction mixture was adjusted to 25° C.

Separately, a water-in-oil emulsion of the initiator was prepared in Isopar M. For this emulsion, a solution of 50 mg of ammonium persulfate in 30 g of water was dispersed in a mixture of 3 g of Span 80 and 7 g of Hypermer 2296 in 30 g of Isopar M using an Ultraturrax at 8000 rpm. Nitrogen was blown through the obtained emulsion, too, for 30 minutes.

Then the initiator emulsion was added to the primary emulsion over a period of 30 minutes, which led to a subsequent inversion of the initial latex. The latex was polymerized at a controlled temperature of 25° C. over a period of 4 hours. A stable latex with a low viscosity and an average particle size of 5 µm was obtained. The complete polymerization conversion was confirmed by gravimetry. The phase inversion was carried out by the addition of 10 g of latex to a mixture of 1 g of high-HLB wetting agent (Nonidet P40, FLUKA) in 150 g of deionized water at 60° C. under agitation using a propeller stirrer at 3000 rpm. The viscosity (specific viscosity/c) of a 0.2% solution of the inverted sample in 1 N NaCl was determined to be 10.34 dL/g.

EXAMPLE 8

The same procedure as in Example 7 was used and the preparation of the primary emulsion was also carried out in the same way, but the addition procedure was changed. The reagents to be added (the aqueous persulfate solution and the oil mixture) were metered using two different pump streams. The analysis of the final stable latex gave complete polymerization conversion and the viscosity of an inverted sample was also found to be of the same order of magnitude (10.08 dL/g). A change in the particle size distribution was observed. A broader distribution was found here with an average size of 8 µm.

EXAMPLE 9

The same specification was used as above. Reagent addition was divided into two steps. After complete addition of the first parts of the separate oil and water phase, the HLB value of the system was found to be 9. At this point, the reaction was kept under the reaction conditions for 30 minutes before the second addition phase was begun.

The added reagents are listed in Table 3.

TABLE 3

Graft copolymerization by inverse emulsion polymerization

| reagents added | amount | time of addition/minute |
|---|---|---|
| 1st addition: | | |
| ammonium persulfate | 20 mg | |
| water | 15 g | |
| | | 10 |
| Isopar M | 15 g | |
| Hypermer 2296 | 5 g | |
| 2nd addition: | | |
| ammonium persulfate | 30 mg | |
| water | 15 g | |
| | | 30 |
| Isopar M | 15 g | |
| Hypermer 2296 | 2 g | |
| Span 80 | 5 g | |

After completion of the second addition period, the polymerization was continued for another four hours at the reaction temperature of 25° C. A stable latex was obtained, the polymerization conversion was 100%. The latex was characterized by a double-type particle distribution with two almost equal maxima of the distribution curve at 1.5 and 10 µm. The viscosity of the 0.2% solution of an inverted sample in 1 N NaCl was found to be 13.36 dL/g.

EXAMPLES 10 AND 11

The same process as in Example 1 was performed but the ratio of DADMAC prepolymer to acrylamide was changed. The added reagents and the viscosity coefficients (specific viscosity/c) of the 0.2% solutions of the obtained graft copolymers in 1 N NaCl are listed in Table 4.

TABLE 4

Graft copolymerization by inverse emulsion polymerization

| added reagents | Example 10 | Example 11 |
|---|---|---|
| water phase | | |
| acrylamide 60% | 140 g | 140 g |
| DADMAC prepolymer | 56 g | 42 g |
| water | 50 g | 37.5 g |
| 1 N NaOH | 2 g | 2 g |
| oil phase | | |
| Isopar M | 95 g | 85 g |
| Tween 85 | 5 g | 5 g |
| initiator emulsion | | |
| ammonium persulfate | 50 mg | 50 mg |
| water | 25 g | 25 g |
| Isopar M | 25 g | 25 g |
| Span 80 | 3 g | 3 g |
| Hypermer 2296 | 7 g | 7 g |
| viscosity dL/g | 13.46 | 17.13 |

The obtained emulsions were stable for a long time, the particle size was found to be 4.5 µm and 100% polymerization conversion was obtained in both comparative experiments.

EXAMPLES 12 AND 13

In the following comparative examples, the special nature of the polymerization process was shown using a polymeric compound as part of the water-soluble initiation system, compared with an ordinary inversion emulsion technique.

The same process was used for the preparation of a graft copolymer emulsion as in Example 1. A copolymer of DADMAC with dimethylaminoethyl methacrylate with 5.5 mole % amine functions was used as the DADMAC prepolymer. The following Table 5 contains the added reagents for both experiments.

Latex polymerization of the Comparative Example 12 gave a stable copolymer emulsion, in which the monomeric acrylamide was completely converted.

The viscosity of the 0.2% solution of an inverted copolymer sample in 1 N NaCl was found to 11.37 dL/g.

In polymerization Example 13 in which the persulfate was added in an aqueous solution, no polymerization occurred within the reaction time of eight hours.

TABLE 5

Procedure used in the comparative experiments

| added reagents | Example 12 | Example 13 |
| --- | --- | --- |
| water phase | | |
| 48% acrylamide | 175 g | 175 g |
| DADMAC prepolymer | 84 g | 84 g |
| water | 50 g | 75 g |
| 1 N NaOH | 3.5 g | 3.5 g |
| oil phase | | |
| Isopar M | 120 g | 145 g |
| Tween 80 | 3 g | 3 g |
| Hypermer 1083 | | 7.5 g |
| Span 80 | | 4.5 g |
| initiator phase | w/o emulsion | aqueous solution |
| ammonium persulfate | 200 mg | 200 mg |
| water | 25 g | 1.8 g |
| Isopar M | 25 g | |
| Hypermer 1083 | 7.5 g | |
| Span 80 | 4.5 g | |

What is claimed is:

1. Comb-like branched, water-soluble cationic acrylamide copolymers, prepared from 1–40 mole % of a water-soluble cationic prepolymer backbone of formula I

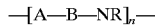   I where A is an unsaturated ammonium compound or acrylamide and B—NR— is selected from the the group consisting of olefinically unsaturated, functional amine-group-containing monomers, triethanolamine, and diethanolalkylamine, and the amount of B—NR is 1 mole % to 50 mole % and n represents a degree of polymerization which leads to molecular weights in the range from 1000 to 200,000 g/mole, and 60 to 99 mole % acrylamide by graft polymerization of the acrylamide onto the amine-group-containing cationic prepolymer backbone with a water-in-oil emulsion technique, and the comb-like branched acrylamide copolymers have a molecular weight of >1 million.

2. Cationic acrylamide copolymers according to claim 1, wherein A is an unsaturated ammonium compound, so that a rigid backbone results.

3. Cationic acrylamide copolymers according to claim 2, wherein the unsaturated ammonium compound is selected from 2-acryloyloxyethyltrimethylammonium chloride, 3-methacrylamidopropyltrimethylammonium chloride, 2-methacryloyloxyethyltrimethylammonium chloride and diallyldimethylammonium chloride.

4. Cationic acrylamide copolymers according to claim 1, wherein A is acrylamide, so that a flexible backbone results.

5. Cationic acrylamide copolymers according to claim 1 wherein B—NR— is selected from dialkylaminoethyl acrylate, dialkylaminoethyl methacrylate, dialkylaminopropyl acrylamides, dialkylaminopropyl methacrylamides, and alkyl-substituted and unsubstituted diallylamines.

6. Cationic acrylamide copolymers according to claim 1 wherein the acrylamide copolymers with high molecular weight are obtained by a free radical polymerization method using a redox initiation system where the water-soluble cationic prepolymer backbone of formula I is the reducing agent and a salt of persulfuric acid is the oxidizing agent of the initiation system.

7. Method for the preparation of a comb-like branched, water-soluble cationic acrylamide copolymer, in which a graft polymerization is carried out with an inverse emulsion polymerization process with 1–40 mole % of a rigid cationic water-soluble prepolymer backbone of formula I

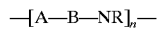   I in which A is an unsaturated ammonium compound or acrylamide and B—NR— is selected from the group consisting of olefinically unsaturated, functional amine-group-containing monomers, triethanolamine, and diethanolalkylamine, the amount of B—NR— is 1 mole % to 50 mole % and n represents a degree of polymerization which is carried out to a molecular weight of 1000 to 200,000 g/mole, and 60 to 99 mole % of an acrylamide, where, during the advancing polymerization, an initial, stabilized oil-in-water emulsion is inverted by the addition of an inverse emulsion of a water-soluble initiator in oil or by the separate addition of an aqueous solution of the initiator and a solution of low-HLB wetting agents in oil, to produce a water-in-oil emulsion.

8. Method for the preparation of cationic acrylamide copolymers according to claim 7, wherein the acrylamide copolymers with high-molecular weight are obtained by a free radical polymerization using a redox initiation system, where the water-soluble cationic prepolymer backbone of formula I is the reducing agent and a salt of persulfuric acid is part of the initiation system.

9. Method for the preparation of cationic acrylamide copolymers according to claim 8, wherein the persulfuric acid salt in an aqueous solution and the wetting agent with low HLB, dissolved in oil, are added separately and simultaneously to the initial oil-in-water emulsion.

10. Method for the preparation of cationic acrylamide copolymers according to claim 7 wherein A is an unsaturated ammonium compound, which is selected from 2-acryloyloxyethyltrimethylammonium chloride, 3-methacrylamidopropyltrimethylammonium chloride, 2-methacryloyloxyethyltrimethylammonium chloride, and diallyldimethylammonium chloride (DADMAC).

11. Method for the preparation of cationic acrylamide copolymers according to claim 7 wherein A is acrylamide.

12. Method for the preparation of cationic acrylamide copolymers according to claim 7 wherein the olefinically unsaturated functional amine-group-containing monomers are selected from dialkylaminoethyl acrylates, dialkylaminoethyl methacrylates, dialkylaminopropyl acrylamides, dialkylaminopropyl methacrylamides, and alkyl-substituted and unsubstituted diallylamines.

13. A comb-like, branched water soluble cationic acrylamide copolymer according to claim 1 having a molecular weight greater than 10 million.

14. Cationic acrylamide polymers according to claim 3 wherein the unsaturated ammonium compound is diallyldimethylammonium chloride.

15. Method for the preparation of cationic acrylamide copolymers according to claim 10 wherein the unsaturated ammonium compound is diallyldimethylammonium chloride.

* * * * *